W. C. McGill,
Flour Sieve.
No. 52,729.      Patented Feb. 20, 1866.
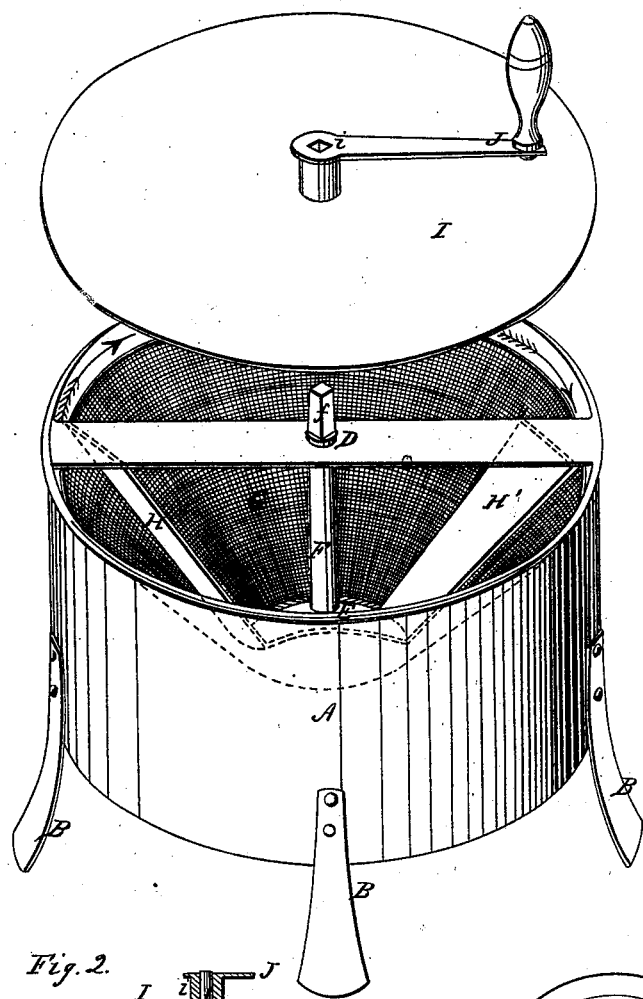
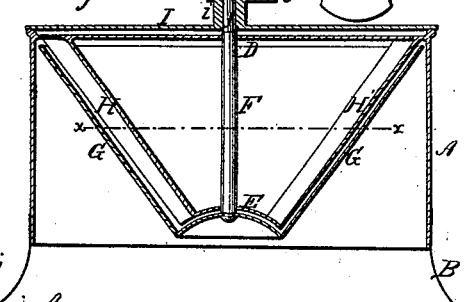
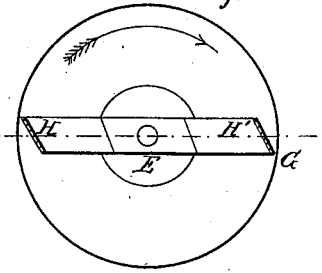
Witnesses:
Inventor:

UNITED STATES PATENT OFFICE.

W. C. McGILL, OF CINCINNATI, OHIO.

FLOUR-SIFTER.

Specification forming part of Letters Patent No. 52,729, dated February 20, 1866.

*To all whom it may concern:*

Be it known that I, WILLIAM C. MCGILL, of Cincinnati, Hamilton county, Ohio, have invented a new and useful Flour-Sifter; and I do hereby declare the following to be a full, clear, and exact description thereof, reference being had to the accompanying drawings, making part of this specification.

This invention relates to an arrangement of revolving conical sieve acting in conjunction with one or more stationary oblique wings or blades for the purpose of rapidly and effectually separating fine from coarse flour.

Figure 1 is a perspective view of a sifter embodying my invention, the lid being removed. Fig. 2 is an axial section of the sifter in the closed condition. Fig. 3 is a horizontal section through the line $x\ x$ of Fig. 2.

A is an outside shell of cylindrical or conical form elevated on three or more legs, B, and provided with upper and lower bearings, D and E, for the shaft F of a sieve, G, having the form of an inverted conic frustum.

H H' are stationary blades or wings set at an angle oblique to the radius, so that as the sieve is rotated in direction of the arrows the said blades act to crowd or press the flour toward the sieve and force the finer particles through the meshes thereof.

The upper end of the shaft consists of a square head, $f$, which enters and fits a corresponding socket, $i$, at the center of a circular cover, I, from whose upper side projects a handle, J, by which the sieve is rotated.

I have selected for illustration a form which I have found to be effective in actual use, but do not desire to restrict the invention to the precise arrangement herein described.

I claim herein as new and of my invention—

The combination of the stationary case A, wings H, the revolving conical sieve G, socket-cover I, and shaft F, substantially as and for the purpose specified.

In testimony of which invention I hereunto set my hand.

W. C. McGILL.

Witnesses:
 GEO. H. KNIGHT,
 JAMES H. LAYMAN.